Dec. 4, 1923.

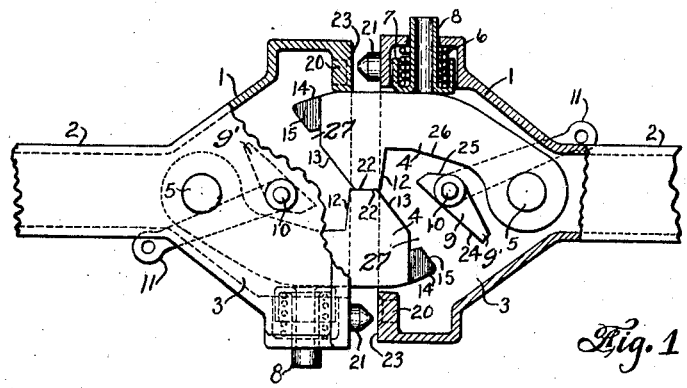

C. H. TOMLINSON 1,476,429

COUPLING MECHANISM

Filed June 7, 1922   3 Sheets-Sheet 2

Inventor
Charles H. Tomlinson

Frank Slusher

By
Attorney

Dec. 4, 1923.  C. H. TOMLINSON  1,476,429
COUPLING MECHANISM
Filed June 7, 1922   3 Sheets-Sheet 3

Inventor
Charles H. Tomlinson

Frank Slusher

By
Attorney

Patented Dec. 4, 1923.

1,476,429

UNITED STATES PATENT OFFICE.

CHARLES H. TOMLINSON, OF MANSFIELD, OHIO.

COUPLING MECHANISM.

Application filed June 7, 1922. Serial No. 566,489.

*To all whom it may concern:*

Be it known that I, CHARLES H. TOMLINSON, a citizen of the United States of America, residing at Mansfield, in the county of Richland and State of Ohio, have invented certain new and useful Improvements in a Coupling Mechanism, of which the following is a specification.

My invention relates to car, electric and fluid pressure connectors, the latter comprising steam, air, etc., and has particular reference to the car coupling mechanism.

The object of my invention is to produce a coupler having counterpart heads as set forth whereby the electric and fluid pressure circuits and cars may be automatically coupled, and having means for maintaining the car or vehicle coupling mechanism in an uncoupled relation when desired so that the counterpart heads may be separated without the constant attention of the train crew. This is of particular advantage when it is desired to "kick" one car from another as is often desired when switching freight cars, as in this case the car coupling mechanism may be set for an uncoupled position and the car which the coupling mechanism controls can be "kicked off" on a siding without any further attention on the part of the train crew.

In the drawings accompanying this specification—

Fig. 1 shows two counterpart coupling devices in the act of moving together, but with the coupling hooks still out of coupling or locking engagement.

Fig. 2 shows the same coupling heads as having moved into final coupling relation with the hooks in coupled relation, as well as the electric and fluid pressure connectors.

Fig. 3 is a side view in elevation of Fig. 2 showing more clearly the electric and fluid coupling attachments.

Figure 4:
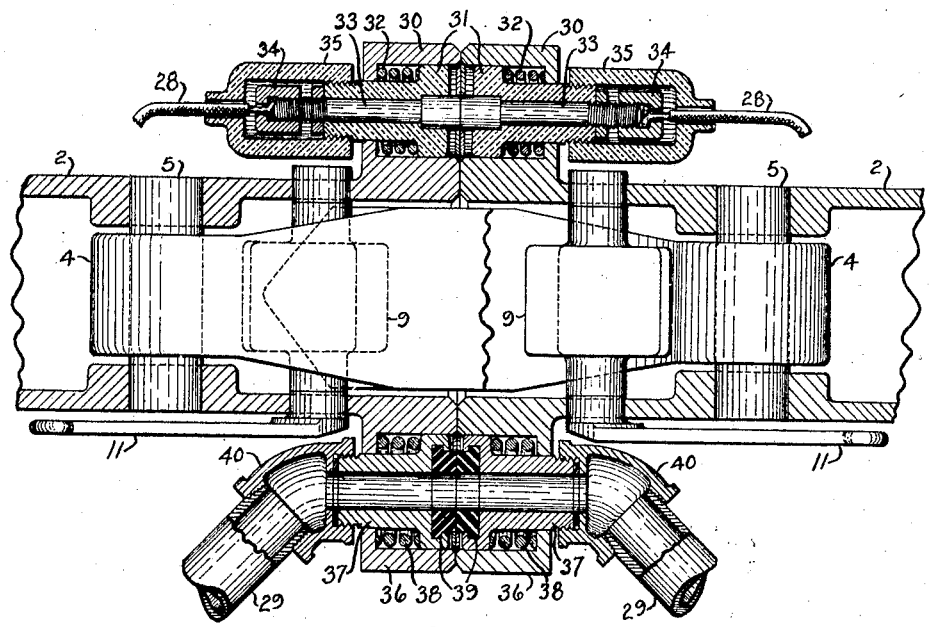
Fig. 4 is an enlarged view in section of my invention showing the electric and fluid coupling mechanism and taken on the line 4—4 of Fig. 2.
Figure 5:
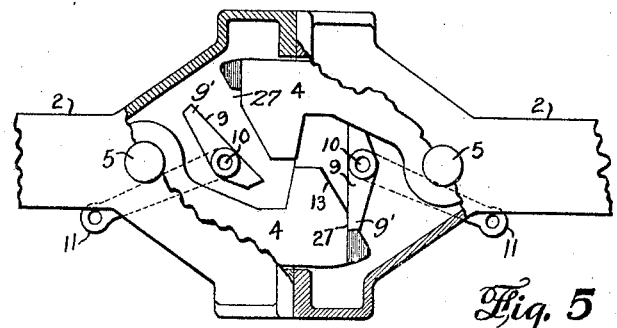

Fig. 5 is a view of my invention in which the coupling heads are shown in coupled relation with the car coupling mechanism moved to a coupling position in which condition the coupler heads are capable of being separated when proper movement is applied to one of the heads. The mechanism for controlling the uncoupling of the cars is shown as having been operated on the right hand coupler head to move the coupling mechanism on each head out of coupling relation.

Figure 6:
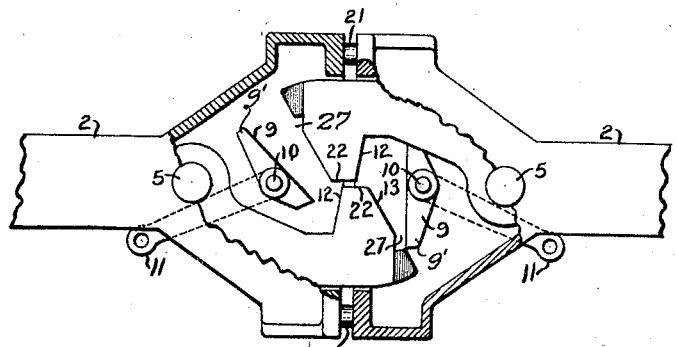

Fig. 6 shows the heads as having separated to a degree and the means for operating the coupling mechanism is on the point of releasing itself from the coupling mechanism and returning to normal position.

Figure 7:
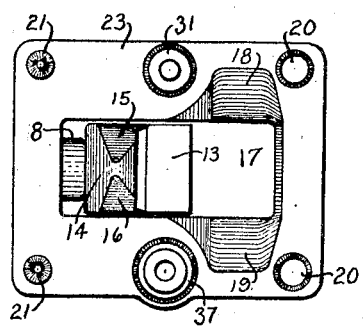

Fig. 7 is a face view of my coupler head.

Figure 8:
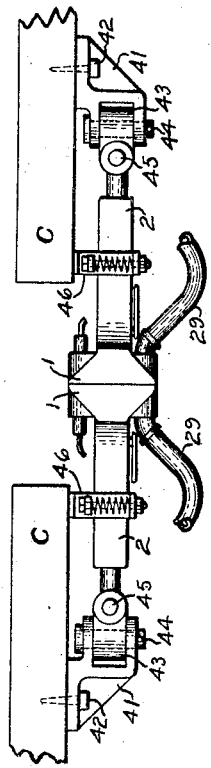

Fig. 8 is a side view of my coupler shown as applied to vehicles in coupled relation.

In my preferred form of construction I employ two counterpart heads, each of which comprises a body member 1 provided with a tail piece 2. The latter is shown incomplete in most figures of the drawings as I am claiming nothing in connection with the tail piece which may be any of the well known means whereby the coupler is attached to the car body. The body member is hollow and has formed therein the recess 3. Within the recess is pivotally mounted the coupling member 4 by means of the pin 5. The member 4 is yieldably maintained in a coupling position with respect to the counterpart head by means of the spring 6 shown as mounted in the pocket 7 and fitted to the plunger guide 8 which engages with the coupling hook 4 tending to move the hook into coupling position. Pivotally mounted within the recess 3 is a cam or operating mechanism 9 pivotally mounted on the pin 10. A handle 11 which may be external or internal of the head is provided whereby the cam 9 may be rotated upon or with the pin 10. The coupling member 4, which takes the form of a hook, is provided with a face 12 which engages with a similar face on the counterpart head to maintain the coupler heads in a coupled relation. The hook is also provided with beveled surfaces 13, 14, 15 and 16 practically merging in a point to assist the alining of the coupler heads when they come together in the operation of coupling. The body member is provided with the opening 17 in the face of the coupler and the sloping surfaces 18 and 19. The latter surfaces and the pointed construction of the hook members tend to guide the hook of the counterpart head into the opening 17 when the heads are moved in a coupling direction. The face of the coupler head is provided with openings 20—20 and projecting pins 21—21 and as each head is provided with these openings and pins, and as the heads are constructed alike, the pins on one head, will enter the opening on the cooperating head. This engagement of the pins with the recess 20 will maintain the heads against relative vertical or horizontal movement when the heads are in coupled relation. They will also tend to cause the coupler heads to move with a direct longitudinal movement during the last portion of the movement of heads toward each other thereby limiting any relative side movement in the final coupling operation, which will be very likely to happen if the heads were guided into coupled relation only by means of the hook members 4 engaging with each other and with the body member 1.

In Fig. 1 are shown two counterpart heads in which the coupling hooks 4—4 have entered the opening 17 on the cooperating head thereby forming a preliminary alinement of the heads. Upon further movement toward each other the pin 21—21 of one head will engage with the opening 20—20 on the cooperating head thereby further alining the heads into final relation and cause them to move in a direct longitudinal line into final coupled relation. This direct movement is of benefit as it prevents any side movement of the parts, relative to each other, which may be attached to the heads to act as couplings for the fluid pressure, electric circuits, etc., and permit them to be brought together in direct alinement thereby reducing wear of the parts and complication in their construction.

During the operation of coupling the side faces 22—22 of the coupling members 4—4 will be in engagement, but as soon as the faces 23—23 of the heads have been brought into final engagement the faces 22—22 will be moved out of engagement and the coupling members 4—4 under the action of the springs 6—6 will be moved into coupling engagement as shown in Fig. 2 with the faces 12—12 in engagement with each other.

With the coupling members 4—4 in coupled relation the face 24 of each uncoupling cam 9 will engage the face 12 of the coupling member of the counterpart head and the face 25 will engage the face 26 as shown in Fig. 2 or in very close relation.

When the coupler heads are in the coupled relation shown in Fig. 2 the cars will be made to move in unison either pushing or pulling each other, and will be maintained in a fixed coupled relation.

When it is desired to uncouple one car from the other it is only necessary to operate the handle 11 of either head thereby rotating the cam about or with its supporting pin 10 which operation will cause the cam to force the coupling members 4—4 of coupling relation against the tension of the spring 6—6. It is only necessary to operate one of the cam members 9 by means of the lever 11 as the operation of one cam member will act on the two interlocked hooks and will force the two interlocked hooks into an uncoupled relation. In order that the one operating the uncoupling mechanism will not be obliged to stand between the cars or give further attention to the uncoupling operation I provide a notch 27 in the face 13 of each hook so positioned that the end 9' of the cam 9 (see Fig. 5) on either head will automatically engage with the notch in the hook of the counterpart head when the cam is operated and thereby maintain the coupling members 4—4 in uncoupled relation without the necessity of the operator holding the cam in the uncoupling position. This will be recognized as of considerable advantage where, as already stated, it is desirous of "kicking" one car from another where both cars are moving, as it is only necessary to set the uncoupling cam on one head in uncoupled position and no further attention will be necessary on the part of the operator.

I also position the notch 27 with respect to the cam 9 on the cooperating head so that the hooks, when the couplers are apart, can not move back into locking engagement with each other and cannot move into engagement with each other until such a time as the faces 12—12 have moved out of alinement with each other as shown in Fig. 6. Here the cam 9 is shown as just on the point of releasing from the notch 27 and the faces 22—22 of the hooks in an overlapped position. A slightly further moving of the heads apart will permit the hooks of the counterpart heads to assume a position shown in Fig. 1. By positioning the notch 27 with respect to the cam 9 as just outlined assurance is had that the hooks will pass that point where they will interlock before they are free to act under the spring 6, and hence the danger of the hooks re-locking before desired is obviated. It is evident, however, that as soon as the heads are entirely separated that all parts will automatically re-set for re-coupling when desired. The engaging face of the notch 27 is slightly undercut to further assure engagement with the cam 9 until the heads are sufficiently separated to prevent re-locking of the hooks 4—4.

I also mount upon each coupler a mechanism for coupling a train line circuit 28—28 such as a signal circuit, and a mechanism for connecting the fluid pressure lines 29—29. The electric connector comprises the casing 30 provided with a recess therein. Mounted in the recess is an insulating element 31 constantly urged forward by the spring 32. Passing through the insulating member 31 and secured therein is a projecting metallic contactor 33 arranged to engage with a similar contactor on a counterpart head. To the rear end of the contactor 33 is secured the signal circuit 28 by means of the cap nut 34. Secured to the rear end of the insulating member 31 is an insulating cap 35 which conceals the metallic connection of the signal circuit 28 to the contactor 33 and also limits the forward movement of the contactor 33 and insulating element 31 when the coupling heads are uncoupled, by engaging with the end of the casing 30.

The fluid pressure coupler comprises a similar arrangement to that of the electric coupler in that it consists of a casing 36 provided with a recess therein in which is slidably mounted the member 37 urged forward by the spring 38. In the face of the member 37 is mounted a soft rubber gasket 39 arranged to engage with a similar gasket on the counterpart head. To the rear end of the member 37 is secured a coupling 40 which in turn is attached to the fluid pressure line 29. Extending through the member 37 and the gasket 39 is a passage which communicates with the fluid pressure line 29 and with a similar passage in the counterpart coupler head. When the coupler heads are in an uncoupled relation the gaskets 39 are projected beyond the face of the coupler, but limited in projection by the member 40 engaging with the member 36.

The electric and fluid couplers are automatically locked in coupled relation by the coupling members 4—4 and this locking or coupling of the electric and fluid couplers is made positive until the uncoupling mechanism, comprising the cam 9 and operating lever 11, is rotated to force the coupling members 4—4 apart and maintain them in an uncoupled relation until the air and electric couplers have been broken. The coupling members 4—4 also act as the coupling members for the cars.

In Fig. 8 the couplers are shown as attached to the cars C—C by means of the anchorage member 41 secured to the car by means of the bolts 42. The tail piece 2 is secured to the anchorage 41 by means of the swivel joint 43 whereby lateral movement of the coupler is secured about the pin 44 and vertical movement is secured by means of the pin 45. In order to support the outer ends of the coupler at a reasonably uniform height I employ a spring supporting member 46 which permits up and down movement of the connected couplers relative to the cars as they may pass over brakes in grade, although maintaining the coupler heads at a reasonably uniform level when the cars are uncoupled.

Many modifications may be made in my invention as disclosed herein and departures therefrom, which will occur to those skilled in the art, and which will fall within the scope of my invention, and therefore, I do not wish to be limited other than by my claims.

I claim:

1. A car coupling mechanism comprising a hollow body member, means for attaching the body member to a car, a coupling member pivotally mounted therein to engage and lock with a like coupling member on a counterpart coupling head, unlocking means pivotally mounted within the body member and arranged to engage the coupling member therein and the coupling member on the counterpart coupler to move the coupling members to the unlocked position and means on the coupling member to be engaged by the unlocking means of the counterpart coupler to maintain the coupling members in an unlocked relation.

2. A car coupling mechanism to couple with a counterpart mechanism comprising a body member having means for attachment to a car body, a coupling member movably secured to the body member to engage and lock with the coupling member on the counterpart mechanism, unlocking means movably secured to the body member and arranged to engage the coupling member secured to the body member and the coupling member of the counterpart head to move the coupling members to the unlocked position, and means on the coupling member to be engaged by the unlocking means of the counterpart coupler to maintain the coupling members in an unlocked relation until the counterpart heads are separated.

3. A car coupling device comprising a pair of counterpart coupler heads each having means for securing the head to a car, each head having a coupling member movably secured to the head and arranged to engage and lock with each other and having an unlocked position, unlocking means on each head to engage each of the coupling members to move them to their unlocked position, means to move the unlocking means at will, and means on each coupling member to engage with the unlocking means on the counterpart head and automatically lock with the uncoupling means when the coupling members are moved to their uncoupled position to maintain the coupling members in their uncoupled relation until the coupler heads are separated.

4. A car coupling device comprising a pair of counterpart coupler heads each head having means for securing it to a car, each head having a coupling member movably secured to the head and arranged to engage and lock with each other and having an unlocked position, unlocking means on each head mounted for independent operation of each other and to engage each of the coupling members to move them to their unlocked position, means for operating each unlocking means, means on each coupling member to engage with the unlocking means on the counterpart head to automatically lock with the unlocking means when the coupling members are moved to their uncoupled position and maintain the coupling members in their uncoupled relation until the coupler heads are separated and means to return each coupling member to its normal locked position when the engagement between the coupling member and the unlocking member is broken.

5. A coupling device comprising a pair of counterpart coupling heads, each head having means for attachment to a car, each head having a hollow body member in which is pivotally mounted to move in a horizontal plane a hook shaped coupling member provided with a face to interlock with a like face on the coupling member of the counterpart head, a pivotally mounted cam in each head for engaging the coupling members of each head to move the coupling members to their unlocked position, means secured to each cam and operable from without the head for moving the cam, a spring mounted in each head and acting on the coupling member of that head tending to urge the coupling member to its coupling position and to maintain it in such position, and means on each coupling member to engage the cam mechanism of the counterpart cam and maintain the uncoupling member and the coupling member locked in uncoupled position.

6. A car coupler adapted to couple to a counterpart device comprising in combination a draw head, a spring actuated coupling member secured thereto, actuating means for moving the coupling member to its uncoupling position and having means to engage the coupling member on the counterpart device and move it to its uncoupling position and engage means thereon to maintain the coupling members in their uncoupled relation.

7. In a coupler, a pair of coupler heads each having coupling members movable to an interlocking and a non-interlocking position, means to engage and move the pair of coupling members to an interlocking position, uncoupling means to engage and move the pair of coupling members to a non-interlocking position and means on one of the coupling members to cooperate with the uncoupling means to automatically hold the interlocking means in a non-interlocking relation while the heads are together.

8. A coupler comprising a pair of similar devices, each device comprising a body member, automatic interlocking means to prevent longitudinal movement, means to move the interlocking means to a non-interlocking relation and means to automatically interlock with said interlocking means to maintain the interlocking means in a non-interlocking relation until the couplers are separated.

9. A coupler comprising a pair of similar coupler heads each having a member interlocking with the other to maintain the heads in a coupled relation and means to move the interlocking members out of interlocking relation and automatically interlock with the said member on the co-operating head to maintain them out of locking relation until the heads are separated.

10. A coupler comprising a pair of similar coupler heads each having a member interlocking with the other to maintain the heads in a coupled relation and manual operative means to move the interlocking members out of locking relation and to automatically interlock with one of the interlocking members to maintain the interlocking members out of locking relation until the heads are separated.

In testimony whereof I affix my signature.

CHARLES H. TOMLINSON.